United States Patent
Sano et al.

(10) Patent No.: US 9,770,957 B2
(45) Date of Patent: Sep. 26, 2017

(54) SUSPENSION COIL SPRING AND STRUT TYPE SUSPENSION

(71) Applicant: MITSUBISHI STEEL MFG. CO., LTD., Tokyo (JP)

(72) Inventors: Masanori Sano, Chiba (JP); Hironobu Sayama, Chiba (JP); Toru Hirokane, Chiba (JP)

(73) Assignee: MITSUBISHI STEEL MFG. CO., LTD., Tokyo (JP)

( * ) Notice: Subject to any disclaimer, the term of this patent is extended or adjusted under 35 U.S.C. 154(b) by 45 days.

(21) Appl. No.: 14/927,659

(22) Filed: Oct. 30, 2015

(65) Prior Publication Data

US 2016/0046165 A1    Feb. 18, 2016

Related U.S. Application Data

(63) Continuation of application No. PCT/JP2014/062502, filed on May 9, 2014.

(30) Foreign Application Priority Data

May 10, 2013 (JP) ................................. 2013-100630
May 8, 2014 (JP) ................................. 2014-097117

(51) Int. Cl.
*B60G 11/14* (2006.01)
*B60G 15/06* (2006.01)
(Continued)

(52) U.S. Cl.
CPC .............. *B60G 11/14* (2013.01); *B60G 15/06* (2013.01); *B60G 15/062* (2013.01);
(Continued)

(58) Field of Classification Search
CPC ........ F16F 1/06; F16F 9/32; F16F 1/04; F16F 1/047; B60G 3/28; B60G 11/14;
(Continued)

(56) References Cited

U.S. PATENT DOCUMENTS 354,672 A     12/1886   Barling
RE24,429 E *  2/1958    Keysor ..................... F16F 1/06
                                                            267/170

(Continued)

FOREIGN PATENT DOCUMENTS

DE     3403882     8/1984
DE     4339820     6/1994
(Continued)

OTHER PUBLICATIONS

Extended European Search Report dated Oct. 28, 2016.
(Continued)

*Primary Examiner* — Melaine Torres Williams
(74) *Attorney, Agent, or Firm* — IPUSA, PLLC

(57) ABSTRACT

A suspension coil spring that is to be installed between an upper side pedestal and a lower side pedestal of a strut type suspension for a vehicle includes a coil spring main body such that, in an installation state, an upper coil end is disposed on the upper side pedestal and a lower coil end is disposed on the lower side pedestal, the upper side pedestal and the upper coil end contact at two upper contact points, and the lower side pedestal and the lower coil end contact at one lower contact point. The two upper contact points are separated in a front-to-rear direction of the vehicle. The one lower contact point is disposed at a position that is in a direction toward outside the vehicle from a plane that passes through the two upper contact points and that is parallel to a coil central axis.

7 Claims, 10 Drawing Sheets

(51) Int. Cl.
*F16F 1/04* (2006.01)
*F16F 1/12* (2006.01)

(52) U.S. Cl.
CPC ............... *B60G 15/063* (2013.01); *F16F 1/04* (2013.01); *F16F 1/047* (2013.01); *F16F 1/123* (2013.01); *B60G 2200/10* (2013.01); *B60G 2200/142* (2013.01); *B60G 2202/12* (2013.01); *B60G 2202/312* (2013.01); *B60G 2204/1242* (2013.01); *B60G 2206/42* (2013.01); *B60G 2206/426* (2013.01)

(58) Field of Classification Search
CPC .... B60G 15/06; B60G 15/062; B60G 15/063; B60G 2206/42; B60G 2206/426
USPC ........................................ 267/174, 179, 286
See application file for complete search history.

(56) References Cited

U.S. PATENT DOCUMENTS

| | | | |
|---|---|---|---|
| 4,561,640 | A | 12/1985 | Enke et al. |
| 4,903,985 | A | 2/1990 | Muhr et al. |
| 6,328,290 | B1 | 12/2001 | Imaizumi et al. |
| 6,712,346 | B2 * | 3/2004 | Imaizumi ................ B60G 3/06 267/179 |
| 2001/0035601 | A1 | 11/2001 | Imaizumi et al. |
| 2002/0113353 | A1 | 8/2002 | Erhardt et al. |
| 2004/0169322 | A1 | 9/2004 | Ogura et al. |
| 2004/0169324 | A1 | 9/2004 | Bottene et al. |
| 2005/0051937 | A1 | 3/2005 | Umezawa et al. |

FOREIGN PATENT DOCUMENTS

| | | | | |
|---|---|---|---|---|
| DE | 69715550 | | 3/2003 | |
| EP | 0728602 | | 8/1996 | |
| FR | 2540586 | A1 * | 8/1984 | ............ B60G 15/07 |
| JP | S58-032970 | U | 7/1983 | |
| JP | S59-199313 | | 11/1984 | |
| JP | 2642163 | | 8/1997 | |
| JP | H10-281197 | | 10/1998 | |
| JP | 2000-104772 | | 4/2000 | |
| JP | 3960710 | | 8/2007 | |
| JP | 2008-241043 | | 10/2008 | |
| JP | 4336203 | | 9/2009 | |
| JP | 2012-057777 | | 3/2012 | |
| WO | 03/046406 | | 6/2003 | |

OTHER PUBLICATIONS

International Search Report dated Jun. 10, 2014.

Japanese Office Action dated May 19, 2015.

Information Offer Form provided for Japanese Patent Application No. 2014-097117.

Measurement result Report 1 provided for Japanese Patent Application No. 2014-097117.

Measurement result Report 2 provided for Japanese Patent Application No. 2014-097117.

Taiwanese Office Action dated May 3, 2016.

* cited by examiner

SUSPENSION COIL SPRING AND STRUT TYPE SUSPENSION

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2014/062502 filed on May 9, 2014 and designating the U.S., which claims priority to Japanese Patent Application No. 2013-100630 filed on May 10, 2013, and Japanese Patent Application No. 2014-097117 filed on May 8, 2014. The entire contents of the foregoing applications are incorporated herein by reference.

BACKGROUND OF THE INVENTION

1. Field of the Invention

The present invention relates to a suspension coil spring that is used for a strut type suspension for a vehicle, and a strut type suspension that includes the suspension coil spring.

2. Description of the Related Art

Recently, a strut type suspension that is widely spread as a suspension for a vehicle is configured such that a shock absorber is used as a positioning stay (strut) with respect to a wheel. The shock absorber, as a strut, includes a cylinder; a rod that is slidably supported by a cylinder; and a suspension coil spring that is provided at an outer circumferential side of the rod.

In this strut type suspension, an upper end of a rod is connected to a vehicle body through a strut mount or the like, and at the same time, a lower end of a cylinder is rigidly joined to a knuckle that supports a wheel, so that the wheel can be rotated. The knuckle is pivotably joined to the vehicle body through a lower arm.

Further, the suspension coil spring is disposed between an upper side pedestal that is fixed to the side of the vehicle body and a lower side pedestal that is fixed to the outer circumferential side of the cylinder, so that the suspension coil spring is in a compressed state. The suspension coil spring is supported at the outer circumferential side of the rod.

The above-described strut type suspension is advantageous compared to those of other independent suspension types because the number of the parts can be small, the structure can be simple, and an installation space can be small.

However, in a strut type suspension, an axis of the strut is shifted relative to a load input axis (the axis that connects a tire grounding point and an upper mount point of the strut), so that bending moment can be generated in the strut. The bending moment can cause lateral force to be applied to the sliding portion of the shock absorber. Thus, the friction of the rod can be increased, and a smooth motion of the shock absorber can be prevented. Consequently, the bending moment can be a cause of degrading riding comfortableness of the vehicle.

As a method of reducing such bending moment, it has been proposed to deform the shape of the suspension coil spring, or to provide a reinforced stopper at a coil end. As a method of reducing by deforming the shape of the suspension coil spring, for example, Patent Document 1 proposes a configuration such that the strut is inserted into the suspension coil spring while decentering the suspension coil spring to the strut, and a pigtail coil end is provided at a lower portion of the suspension coil spring. Here, the pigtail coil end is decentered to and linked to the suspension coil spring. Further, Patent Document 2 proposes a configuration such that a spring center line of the suspension coil spring has an S-shape in an unloaded state.

Further, as a method of reducing by providing a reinforced stopper, for example, Patent Document 3 proposes a configuration such that a plurality of protrusions is provided at an coil end, and some protrusions of the plurality of the protrusions are selectively contact a spring pedestal depending on the weight of the load that is applied to the suspension coil spring. Furthermore, Patent Document 4 proposes a configuration such that one reinforced stopper is provided at an upper side pedestal of the suspension coil spring and one reinforced stopper is provided at a lower side pedestal of the suspension coil spring.

PATENT DOCUMENT 1: Japanese Examined Utility Model Publication No. S58-032970
PATENT DOCUMENT 2: Japanese Patent No. 2642163
PATENT DOCUMENT 3: Japanese Patent No. 4336203
PATENT DOCUMENT 4: European Patent Publication No. 728602

SUMMARY OF THE INVENTION

However, in the configuration that is disclosed by Patent Document 1, the suspension coil spring is decentered with respect to the strut. Thus, the installation space for installing the suspension coil spring may be enlarged. Further, for the configuration such that the pigtail coil end is decentered to the suspension coil spring and the pigtail coil end is linked to the lower portion of the suspension coil spring, a sufficient effect may not be obtained that is for reducing the bending moment. Further, for the configuration that is disclosed by Patent Document 2, there is a problem that the installation space can be enlarged because the shape of the suspension coil spring is the S-shape.

Further, in the configuration that is disclosed by Patent Document 3, it may be necessary to provide the plurality of the protrusions at the coil end portion, so that its production can be disadvantageously complicated. Furthermore, in the configuration that is disclosed by Patent Document 4, specifically, a point of action (an upper loading position) by reaction force of the spring with respect to the upper side pedestal may not be positioned at the center of the coil end because the reinforced stopper is placed at a point on an element wire of the coil end portion. Consequently, the bending moment that is generated in the strut may not be removed reliably.

The present invention is achieved in view of the above-described points. An object of the present invention is to provide a suspension coil spring and a strut type suspension that includes the suspension coil spring such that an installation space can be reduced, and friction can be prevented from being generated in a shock absorber.

According to an aspect of the present invention, a suspension coil spring that is to be installed between an upper side pedestal and a lower side pedestal of a strut type suspension for a vehicle includes a coil spring main body such that, in an installation state of the suspension coil spring, an upper coil end is disposed on the upper side pedestal and a lower coil end is disposed on the lower side pedestal. In the installation state, the upper side pedestal and the upper coil end substantially contact at two upper contact points on the upper coil end. In the installation state, the lower side pedestal and the lower coil end substantially contact at one lower contact point on the lower coil end. The two upper contact points are disposed on the upper coil end so that the two upper contact points are separated in a front-to-rear direction of the vehicle. The one lower contact point is disposed at a position of the lower side pedestal that is in a direction toward outside the vehicle from a plane that passes through the two upper contact points and that is parallel to a coil central axis.

According to the aspect of the present invention, a space for installing the coil spring can be reduced, and at the same time, the friction of the shock absorber can be prevented from occurring. In addition, uniform load (reaction force of the spring) can be applied to a strut mount bearing, and thereby a strut mount can be prevented from being distorted.

DESCRIPTION OF THE PREFERRED EMBODIMENTS

Figure 1:
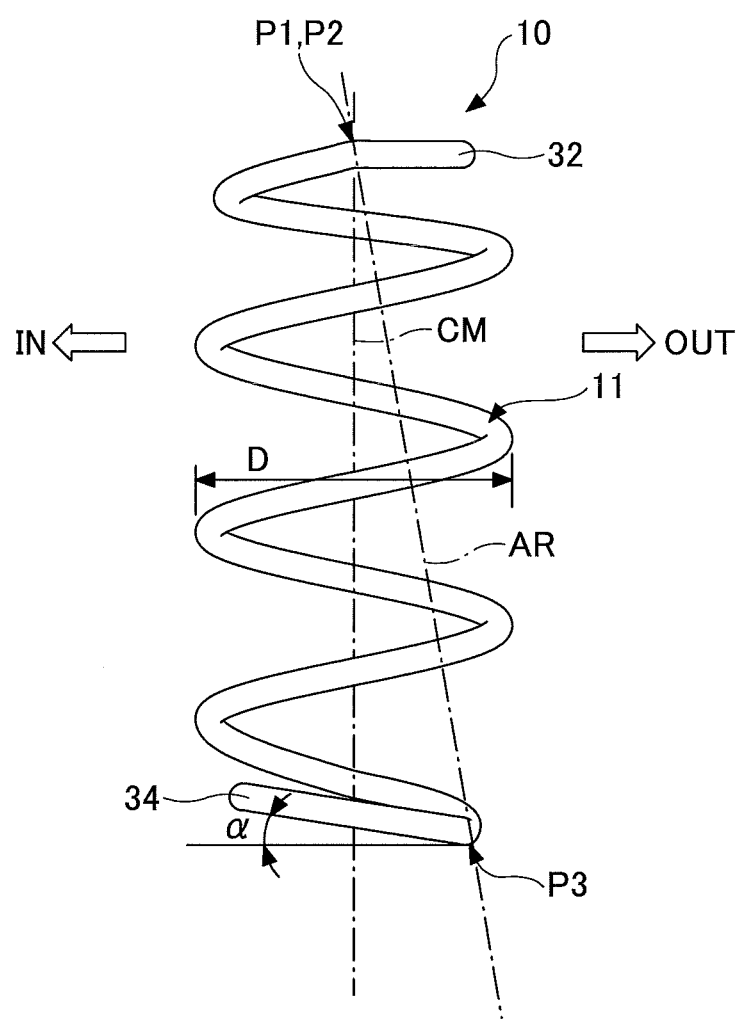
FIG. 1 is a front view of a suspension coil spring according to an embodiment of the present invention.

Next, a non-limiting exemplary embodiment of the present invention is explained by referring to the accompanying drawings.

Note that, in the descriptions of all the accompanying drawings, the same or corresponding reference numerals are attached to the same or corresponding members or components, and thereby duplicate explanations are omitted. Additionally, the drawings are not intended to show relative ratios among members or components, except as indicated otherwise. Thus, specific sizes can be determined by a person ordinarily skilled in the art in light of the following non-limiting embodiment.

Furthermore, the embodiment that is explained below is illustrative, and it is not intended to limit the present invention. Some features and the combinations thereof that are described in the embodiment may not be essential to the present invention.

Next, the embodiment of the present invention is explained together with the drawings.

Figure 2:
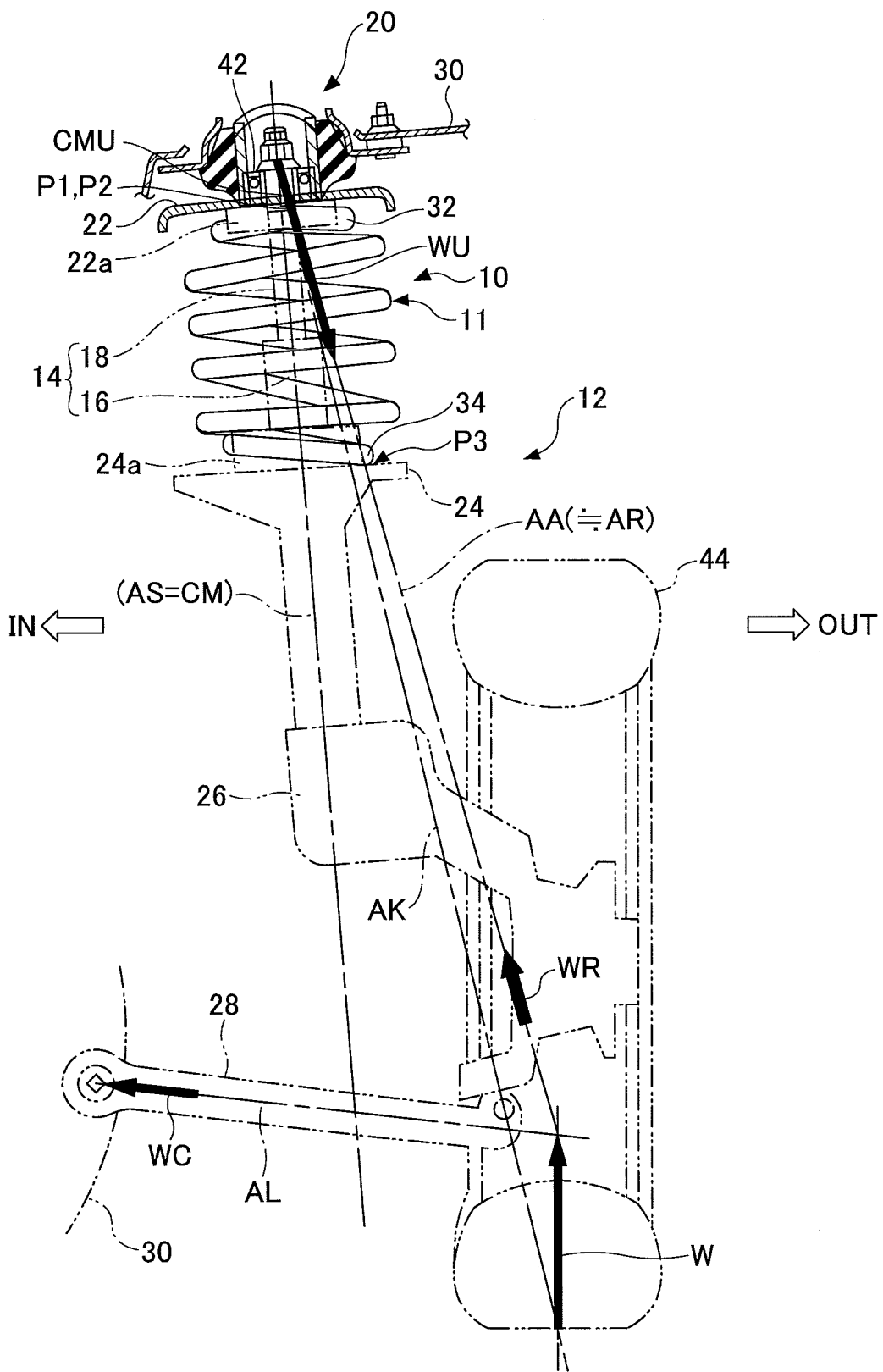
FIG. 2 is a configuration diagram showing a strut type suspension in which the suspension coil spring according to the embodiment of the present invention is assembled.
Figure 3:
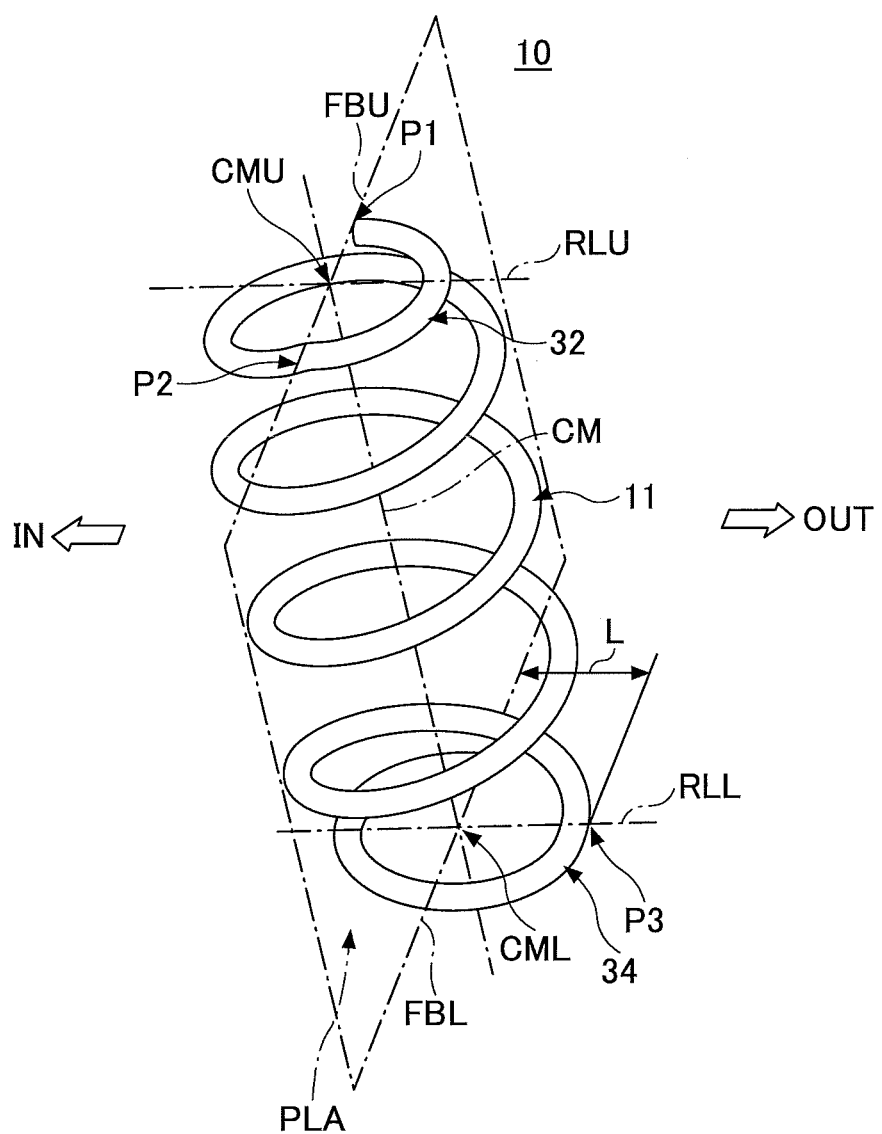
FIG. 3 is a perspective view of the suspension coil spring according to the embodiment of the present invention.

FIGS. 1 and 3 show a suspension coil spring 10 according to the embodiment of the present invention, and FIG. 2 shows a strut type suspension 12 (which is simply referred to as the suspension 12, hereinafter) to which the suspension coil spring is assembled. Note that, in FIG. 2, portions excluding a supporting portion of an upper end of the suspension 12 are shown by two-dot chain lines.

First, a configuration of the suspension 12 is explained.

As shown in FIG. 2, the suspension 12 includes a shock absorber 14 as a stay (strut) for positioning a wheel 44. The shock absorber 14 is joined to a cylinder 16 in which a fluid, such as a gas or an oil, is sealed, and the shock absorber 14 is joined to a piston (depiction is omitted) that is slidably disposed inside the cylinder 16. The shock absorber 14 includes a rod 18 that protrudes upward from the cylinder 16.

An upper end of the rod 18 is elastically joined to a vehicle body 30 of a vehicle through a strut mount 20. Further, an upper side pedestal 22 is disposed at a side of the upper end of the rod 18, and a lower side pedestal 24 is disposed at an intermediate portion of the cylinder 16.

While the suspension coil spring 10 is in a compressed state between the upper side pedestal 22 and the lower side pedestal 24, the suspension coil spring 10 is disposed at an outer circumferential position of the shock absorber 14. As a result of this, spring reaction force WR is generated in the suspension coil spring 10 that is in an installed state. In the following explanation, an axis line along which the spring reaction force WR acts is said to be a spring reaction force axis AR.

A lower end portion of the shock absorber 14 is rigidly joined to a knuckle 26 that supports the wheel 44, so that the wheel 44 can be rotated. The knuckle 26 is pivotably joined to the vehicle body 30 of the vehicle through a lower arm 28.

Consequently, the wheel 44 that is pivotally supported by the knuckle 26 supports the vehicle body 30 through the shock absorber 14 and the suspension coil spring 10, and at the same time, the wheel 44 supports the vehicle body 30 through the lower arm 28.

Next, a configuration of the suspension coil spring 10 is explained.

FIG. 1 shows the suspension coil spring 10 in a free state in which no load is applied. In the suspension coil spring 10, an upper coil end portion 32 that is to be disposed on the upper side pedestal 22 is formed at an upper side of a coil spring main body 11, and a lower coil end portion 34 that is to be disposed on the lower side pedestal 24 is formed at a lower side of the coil spring main body 11.

The suspension coil spring 10 according to the embodiment is configured such that, in the free state in which no load is applied, a coil axis that connects centers of outer diameters of the coil spring main body 11 is a straight line. However, the suspension coil spring 10 according to the embodiment is not limited to this. Furthermore, in the free state, a coil outer diameter D of the coil spring main body 11 that is centered on the coil axis is uniformly set, except for the upper coil end portion 32, the lower coil end portion 34, and transition portions to the corresponding coil end portions 32 and 34. However, the coil outer diameter D is not limited to this.

As described above, in a state in which the suspension coil spring 10 is installed in the suspension 12, the upper coil end portion 32 is disposed on the upper side pedestal 22, and the lower coil end portion 34 is disposed on the lower side pedestal 24. The upper side pedestal 22 and the lower side pedestal 24 are formed to have substantially disk-like shapes. At the center portions of the upper side pedestal 22 and the lower side pedestal 24, mounting portions 22a and 24a are formed, respectively, that have rib-like shapes.

The upper coil end portion 32 and the lower coil end portion 34 of the suspension coil spring 10 are attached to the upper side pedestal 22 and to the lower side pedestal 24, respectively, so that the mounting portion 22a is inserted into inside the upper coil end portion 32, and that the mounting portion 24a is inserted into inside the lower coil end portion 34. In this manner, the suspension coil spring 10 is positioned by the upper side pedestal 22 and the lower side pedestal 24.

Here, the position at which the upper coil end portion 32 contacts the upper side pedestal 22 and the position at which the lower coil end portion 34 contacts the lower side pedestal 24 are explained by using FIGS. 1-4A, and 4B.

Note that, in the following explanation, the center position of the upper coil end portion 32 is referred to as an upper coil end center point CMU, and the center position of the lower coil end portion 34 is referred to as a lower coil end center point CML (cf. FIG. 3).

Further, a line segment that passes through the upper coil end center point CMU and that extends in a front-to-rear direction of the vehicle is referred to as an upper front-to-rear-direction line FBU, and a line segment that passes through the upper coil end center point CMU and that extends in a left-to-right direction of the vehicle is referred to as an upper left-to-right-direction line RLU.

Furthermore, a line segment that passes through the lower coil end center point CML and that extends in the front-to-rear direction of the vehicle is referred to as a lower front-to-rear-direction line FBL, and a line segment that passes through the lower coil end center point CML and that extends in the left-to-right direction of the vehicle is referred to as a lower left-to-right-direction line RLL.

Additionally, an axis that connects the upper coil end center point CMU of the upper side pedestal 22 to the lower coil end center point CML is referred to as a coil central axis CM.

The suspension coil spring 10 according to the embodiment is configured such that, in the free state in which no load is applied, the coil axis coincides with the coil central axis CM. However, the suspension coil spring 10 is not limited to this.

In the embodiment, the upper coil end portion 32 is formed to be a 0.5 turn (a 180 degree turn). Further, the upper coil end portion 32 is configured so that the upper coil end portion 32 is substantially symmetrical with respect to the upper left-to-right-direction line RLU, as shown in FIG. 3.

The upper coil end portion 32 that is formed to be the 0.5 turn has substantially a semicircular shape in a plane view (namely, when the upper coil end portion 32 is viewed from an upper side in the direction of the coil central axis CM). Thus, the upper coil end portion 32 that is formed to be the 0.5 turn has a configuration that includes a pair of end portions P1 and P2 that are separated by 180 degrees (cf. FIG. 3). The upper coil end portion 32 mainly contacts the upper side pedestal 22 at the end portions P1 and P2 (hereinafter, the end portions P1 and P2 are referred to as an upper contact point P1 and an upper contact point P2, respectively).

The upper contact point P1 is an upper end of a spring element wire that is included in the suspension coil spring 10. Further, a position of the upper contact point P2 is separated from that of the upper contact point P1 by a 0.5 turn (i.e., a position that is separated from that of the upper contact point P1 by a 180 degree turn).

The two upper contact points P1 and P2 of the upper coil end portion 32 are positioned on the upper front-to-rear-direction line FBU. Thus, the line segment that connects the upper contact points P1 and P2 of the upper coil end portion 32 are superposed on the upper front-to-rear-direction line FBU. Additionally, a substantially central position between the upper contact point P1 and the upper contact point P2 is the upper coil end center point CMU.

The lower coil end portion 34 is reverse pitched. Here, the "reverse pitch" means that the spring element wire is wound around so that the pitch is reduced.

As shown in FIG. 1, the lower coil end portion 34 is configured so that it has an angle α with respect to the horizontal direction, which is shown by the arrows. The lower coil end portion 34 is a 0.75 turn from a lower end of the spring element wire that is included in the suspension coil spring 10. Note that the number of turns from the lower end of the spring element wire is not limited to the 0.75 turn. It can be from a 0 turn (only in this case, the lower coil end 34 is not reverse pitched) to a 1 turn.

By forming the lower coil end portion 34 to be reverse pitched, the lower coil end portion 34 can contact the lower side pedestal 24 substantially at a single point. Now, assuming a plane PLA (the plane that is shown in FIG. 3 by the dashed line) that passes through the above-described two upper contact points P1 and P2 and that is parallel with the coil central axis CM, the lower coil end portion 34 contacts the lower side pedestal 24 substantially at a single point P3 (the point P3 is referred to as a lower contact point P3, hereinafter) that is positioned in a direction toward outside the vehicle (which is shown by the arrow OUT in FIG. 3 and the like) from the plane PLA.

As shown in FIG. 3, the lower contact point P3 is on the lower left-to-right-direction line RLL, and the lower contact point P3 is located at a position that is separated from the lower coil end center point CML by the distance L, which is shown in FIG. 3 by the arrows, in the direction toward outside the vehicle.

Next, there is explained load that acts on the suspension 12 by using FIG. 2. Here, the suspension coil spring 10 that is configured as described above is installed in the suspension 12.

In FIG. 2, "AS" is a strut axis that is a central axis of the shock absorber 14, "AK" is a kingpin axis that is a steering central axis, "AL" is a lower arm axis that is a central axis of the lower arm 28, and "AA" is a load input axis from a road surface to the shock absorber 14.

The road surface reaction force W from the road surface acts on the suspension 12 from a center position of a contact surface between the wheel 44 and the road surface in the vertical direction. Furthermore, the load axis force WU that is against the road surface reaction force W acts on the suspension 12 from an upper end of the shock absorber 14 along the load input axis AA. The lower arm axis force WC that is the combined force of the road surface reaction force W and the load axis force WU acts on a base portion of the lower arm 28 along the lower arm axis AL.

According to the embodiment, in a state in which the suspension coil spring 10 is installed in the suspension 12, the coil central axis CM coincides with the strut axis AS. However, the embodiment is not limited to this. The coil central axis CM may be tilted with respect to or shifted in parallel with the strut axis AS.

Now, the load input axis AA on which the load axis force WU acts and the spring reaction force axis AR on which the spring reaction force WR of the suspension coil spring 10 acts are focused on.

Figure 8:
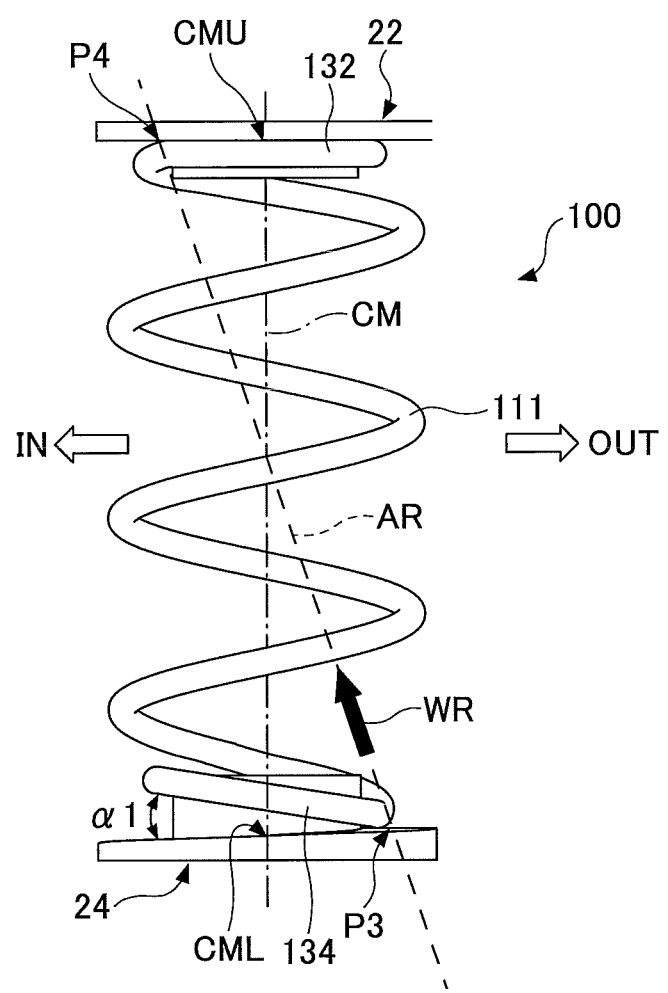
FIG. 8 is a diagram showing a suspension coil spring according to a reference example.

First, for reference, a suspension coil spring 100 is shown in FIG. 8. Here, the suspension coil spring 100 is configured such that, upon being installed in a suspension, the whole surface of an upper coil end portion 132 contacts the upper side pedestal 22.

As shown in FIG. 8, in the suspension coil spring 100, a lower coil end portion 134 is reverse pitched. The lower coil end portion 134 has an angle α1, which is shown by the arrows, with respect to the horizontal direction. The spring reaction force WR mainly acts on the lower contact point P3 because the lower coil end portion 134 is reverse pitched as described above. The lower contact point P3 is located at a position that is separated from the lower coil end center point CML in the direction toward outside the vehicle.

In contrast, the whole surface of the upper coil end portion 132 contacts the upper side pedestal 22. Thus, the spring reaction force WR acts on the upper side pedestal 22 at a point P4 that is located at a position that is opposite to the lower contact point P3 with respect to the coil central axis CM.

Figure 9A:
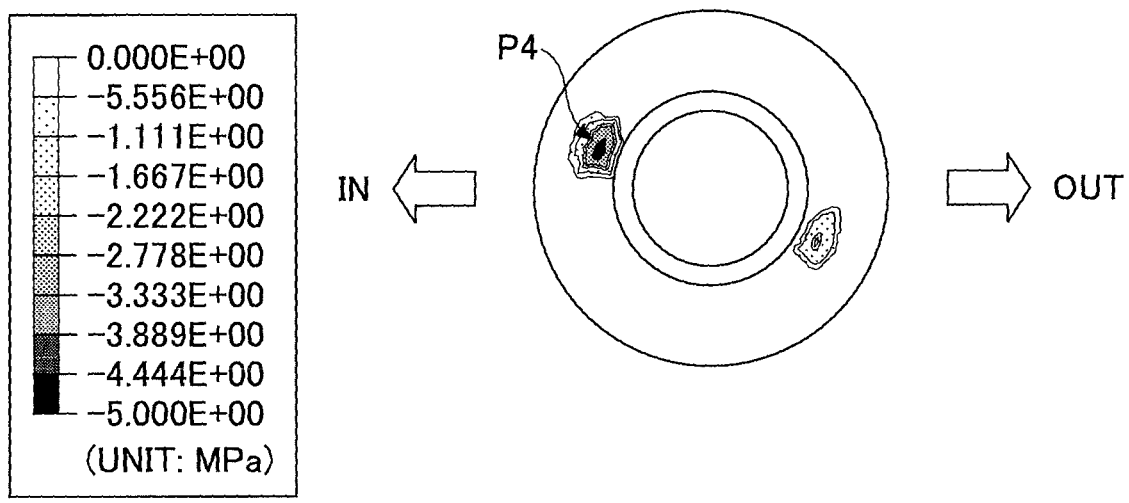
FIG. 9A is a diagram showing a stress distribution on contact between an upper side pedestal and an upper coil end when the suspension coil spring according to the reference example is assembled to the strut type suspension and normal load is applied.
Figure 9B:
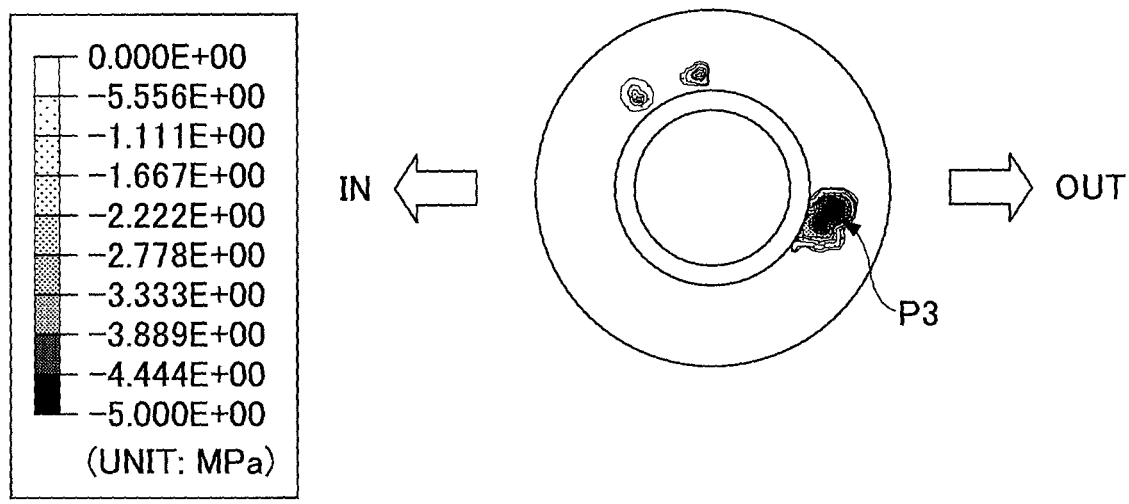
FIG. 9B is a diagram showing a stress distribution on contact between a lower side pedestal and a lower coil end when the suspension coil spring according to the reference example is assembled to the strut type suspension and the normal load is applied.

FIGS. 9A and 9B are diagrams verifying this fact. FIG. 9A shows a stress distribution on contact between the upper coil end portion 132 and the upper side pedestal 22 when the suspension coil spring 100 is assembled to the suspension 12 and normal load is applied. Here, the suspension coil spring 100 is configured such that, when it is assembled to a suspension, the whole surface of the upper coil end 132 contacts the upper side pedestal 22. FIG. 9B shows a stress distribution on contact between the lower coil end portion 134 and the lower side pedestal 24.

In this manner, in the suspension coil spring 100 that is shown in FIG. 8, the position P4 from which the spring reaction force WR acts on the upper side pedestal 22 is located at a position that is significantly separated from the upper coil end center point CMU in the direction toward inside the vehicle (which is shown in FIG. 8 and the like by the arrow IN), as shown in FIG. 9A.

Thus, in the suspension coil spring 100 that is shown in FIG. 8, the spring reaction force axis AR that connects the lower contact point P3 and the position P4 is significantly tilted, and the spring reaction force axis AR is shifted with respect to the load input axis AA. Because of the shift between the load input axis AA and the spring reaction axis AR, bending moment acts on the shock absorber 14, and friction increases at the sliding portion of the shock absorber 14 (the portion where the rod 18 slides with respect to the cylinder 18).

Furthermore, the position P4 on which the spring reaction force acts is significantly separated from the upper coil end center point CMU in the direction toward inside the vehicle. Consequently, a biased load (the spring reaction force) is applied to a bearing 42 of the strut mount 20 (FIG. 2) and the mount can be distorted. This can be a cause of degrading the riding comfortableness.

In contrast, the suspension coil spring 10 according to the embodiment is configured such that, in a state in which the suspension coil spring 10 is assembled to the suspension 12, the upper side pedestal 22 and the upper coil end portion 32 substantially contact only at the two upper contact points P1 and P2. Consequently, the upper side pedestal 22 and the upper coil end portion 32 strongly contact at the two upper contact points P1 and P2.

Figure 4A:
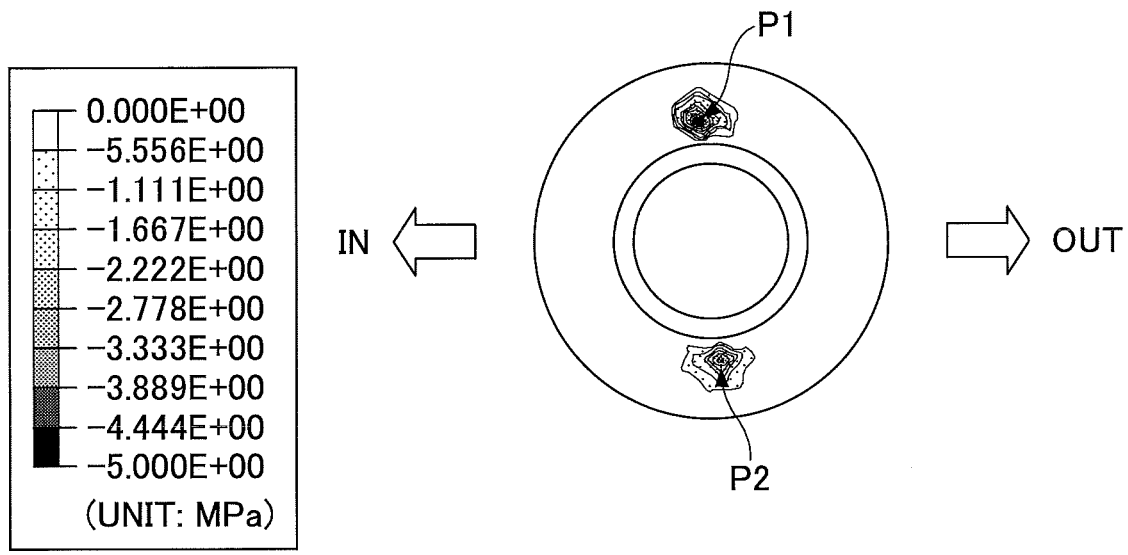
FIG. 4A is a diagram showing a stress distribution on contact between an upper side pedestal and an upper coil end when the suspension coil spring according to the embodiment of the present invention is assembled to the strut type suspension and normal load is applied.

FIG. 4A shows a stress distribution that is generated between the upper coil end portion 32 and the upper side pedestal 22 in a state in which the suspension coil spring 10 according to the embodiment is assembled to the suspension 12. From FIG. 4A, it can be seen that large stress is generated between the upper side pedestal 22 and the upper coil end portion 32 at the upper contact points P1 and P2.

The center position between the upper contact points P1 and P2 substantially coincides with the position of the upper coil end center point CMU. Further, the upper coil end portion 32 contacts the upper side pedestal substantially at the two points. Thus, the upper coil end portion 32 is configured such that the upper coil end portion 32 can be fluctuated with respect to the upper side pedestal 22 around the upper front-to-rear-direction line FBU that connects the upper contact points P1 and P2.

Consequently, for a case in which the suspension coil spring 10 according to the embodiment is used for the suspension 12, an upper point of action of the spring reaction force WR is located substantially at the upper coil end center point CMU, and the upper point of action may not be shifted from this position.

Here, the fact that the upper side pedestal 22 and the upper coil end portion 32 substantially contact only at the two upper contact points P1 and P2 means that, even if a position of the upper coil end portion 32 other than the upper contact points P1 and P2 (which is referred to as the position other than P1 and P2, hereinafter) contacts the upper side pedestal 22, a load that is applied to the position other than P1 and P2 is smaller than the load that is applied to the upper contact points P1 and P2.

Figure 5A:
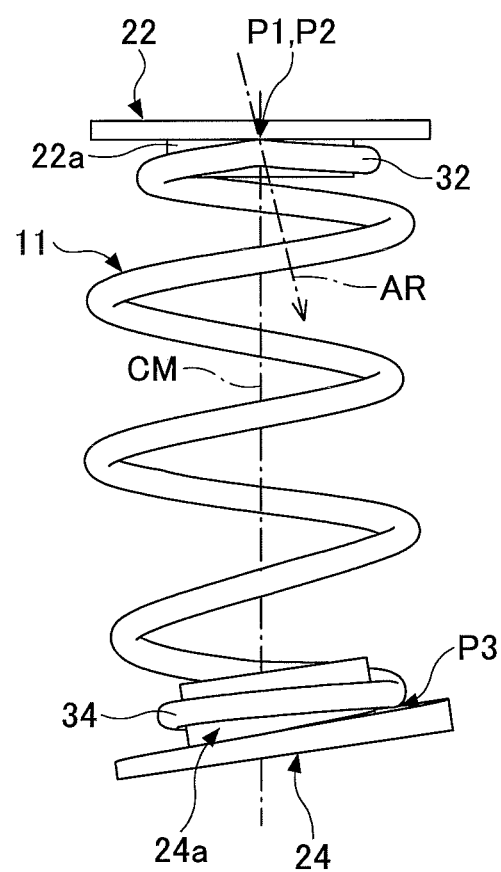
FIG. 5A is a diagram illustrating operation of the suspension coil spring according to the embodiment of the present invention.
Figure 5B:
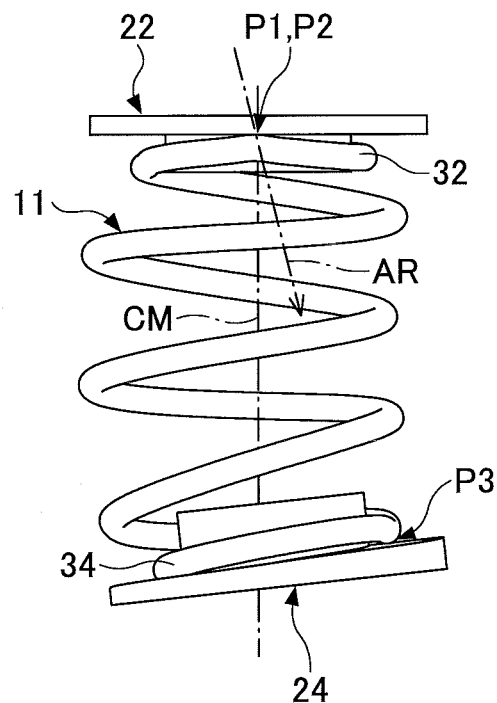
FIG. 5B is a diagram illustrating the operation of the suspension coil spring according to the embodiment of the present invention.
Figure 5C:
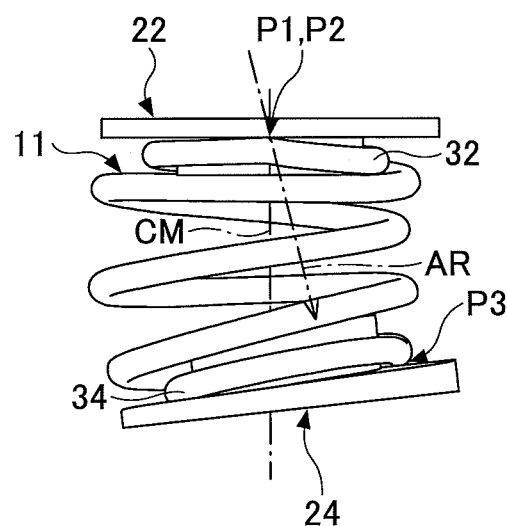
FIG. 5C is a diagram illustrating the operation of the suspension coil spring according to the embodiment of the present invention.

For a case in which the suspension coil spring 10 is assembled to the suspension 12, the suspension coil spring 10 is displaced with respect to the upper side pedestal 22, in response to the road surface reaction force W being input to the suspension 12 from the road surface through the wheel 44 (cf. FIGS. 5A, 5B, and 5C). At this time, it can be considered that, in addition to the upper contact points P1 and P2, the position other than P1 and P2 contacts the upper side pedestal 22 because the upper coil end portion 32 can fluctuated around the upper front-to-rear-direction line FBU that connects the upper contact points P1 and P2.

However, a load that is applied, during the contact, to the position other than P1 and P2 is smaller than the load that is applied to the upper contact points P1 and P2. Consequently, even if the position other than P1 and P2 contacts the upper side pedestal 22, the spring reaction force WR mainly acts on the center position between the upper contact points P1 and P2, namely, on the position of the upper coil end center point CMU.

Further, at the lower side of the suspension coil spring 10, the lower side pedestal 24 and the lower coil end portion 34 are configured such that the lower side pedestal 24 and the lower coil end portion 34 contact substantially at the single lower contact point P3. Thus, the lower side pedestal 24 and the lower coil end portion 34 strongly contact at the single lower contact point P3.

Figure 4B:
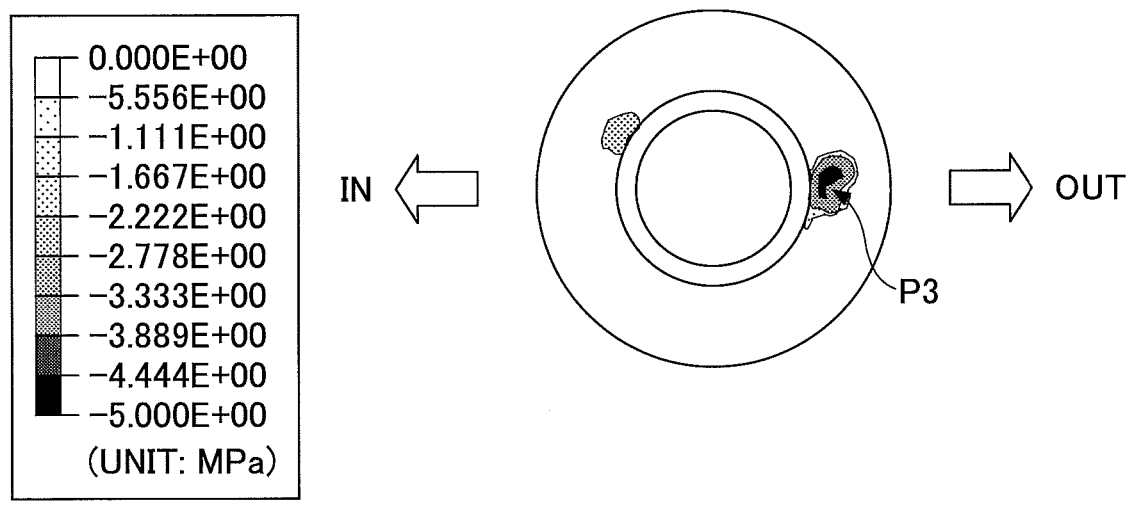
FIG. 4B is a diagram showing a stress distribution on contact between a lower side pedestal and a lower coil end when the suspension coil spring according to the embodiment of the present invention is assembled to the strut type suspension and the normal load is applied.

FIG. 4B shows a stress distribution that is generated between the lower coil end portion 34 and the lower side pedestal 24 in a state in which the suspension coil spring 10 is assembled to the suspension 12. From FIG. 4B, it can be seen that large stress is generated between the lower side pedestal 24 and the lower coil end portion 34 mainly at the lower contact point P3.

Here, the fact that the lower side pedestal 24 and the lower coil end portion 34 contact substantially at the single lower contact point P3 means that, even if a position of the lower coil end portion 34 other than the lower contact point P3 (which is referred to as the position other than P3, hereinafter) contacts the lower side pedestal 24, a load that is applied to the position other than P3 is smaller than the load that is applied to the lower contact point P3.

For a case in which the suspension coil spring 10 is displaced with respect to the lower side pedestal 24, in response to the road surface reaction force W being input to the suspension 12 from the road surface through the wheel 44, it can be considered that the position other than P3, in addition to the lower contact point P3, contacts the lower side pedestal 24.

However, the load that is applied, during the contact, to the position other than P3 is smaller than the load that is applied to the lower contact point P3. Consequently, even if the position other than P3 contacts the lower side pedestal 24, the spring reaction force WR mainly acts on the lower contact point P3 or a position in the vicinity of the lower contact point P3.

The lower contact point P3 or the point in the vicinity of the lower contact point P3 where the lower side pedestal 24 and the lower coil end portion 34 substantially contact becomes the lower point of action of the spring reaction force WR. The lower point of action of the spring reaction force WR can be moved by adjusting, for example, the angle α of the lower coil end portion 34 with respect to the horizontal direction. Thus, by adjusting the angle α of the lower coil end portion 34 with respect to the horizontal direction, the spring reaction force axis AR can be substantially coincided with the load input axis AA (AR is nearly equal to AA).

In this manner, the load axis force WU can be cancelled by the spring reaction force WR, the lateral force of the shock absorber 14 can be avoided, and the friction can be prevented from occurring. Furthermore, the spring reaction force WR acts substantially on the upper coil end center point CMU. Thus, a substantially uniform load is applied to the bearing 42 of the strut mount 20, and thereby the strut mount 20 can be prevented from being distorted.

Next, there are explained a contact state between the upper coil end portion 32 and the upper side pedestal 22 and a contact state between the lower coil end portion 34 and the lower side pedestal 24, upon the road surface reaction force W being input, through the wheel 44, to the suspension 12 in which the suspension coil spring 10 is installed.

FIGS. 5A to 5C show the contact state between the upper coil end portion 32 and the upper side pedestal 22 and the contact state between the lower coil end portion 34 and the lower side pedestal 24, upon the road reaction force W from the wheel 44 being changed.

FIG. 5A shows a state in which the road reaction force W is small. FIG. 5B shows a state in which the road reaction force W is normal. FIG. 5C shows a state in which the road reaction force W is large.

As the road reaction force W is changed, the suspension coil spring 10 is deformed depending on the magnitude of the road reaction force W. In accordance with the deformation of the suspension coil spring 10, the contact state of the upper coil end portion 32 with respect to the upper side pedestal 22 and the contact state of the lower coil end portion 34 with respect to the lower side pedestal 24 can be changed.

However, in a state in which the suspension coil spring 10 according to the embodiment is assembled to the suspension 12, the upper side pedestal 22 and the upper coil end portion 32 substantially contact only at the two upper contact points P1 and P2 that are provided in the upper coil end portion 32.

Thus, the upper side pedestal 22 can be fluctuated around the upper front-to-rear-direction line FBU that connects the upper contact point P1 and the upper contact point P2 because the upper coil end portion 32 and the upper side pedestal 22 strongly contact at the two points that are the upper contact points P1 and P2. Consequently, even if the suspension coil spring 10 is deformed depending on the magnitude of the road reaction force W, the upper front-to-rear-direction line FBU can always maintain the position such that the upper front-to-rear-direction line FBU passes through the upper coil end center point CMU.

In addition, as for the lower coil end portion 34, in a state in which the suspension coil spring 10 according to the embodiment is assembled to the suspension 12, the lower side pedestal 24 and the lower coil end portion 34 contact substantially at the single lower contact point P3 that is provided in the lower coil end portion 34. In this manner, the lower coil end portion 34 strongly contacts the lower side pedestal 24 at the lower contact point P3. Even if the suspension coil spring 10 is deformed depending on the magnitude of the road reaction force W, the lower contact point P3 can maintain the position that is on the lower left-to-right-direction line RLL and that is separated from the lower coil end center point CML in the direction toward outside the vehicle.

Thus, even if the road reaction force W is changed, the direction in which the spring reaction force axis AR is extended (the direction that is indicated by the dashed-line arrow in FIGS. 5A to 5C) may not be significantly changed. Consequently, the state in which the load input axis AA coincides with the spring reaction axis AR is maintained, so that the friction in the shock absorber 14 can be prevented from occurring, and that the strut mount 20 can be prevented from being distorted.

Next, a modified example of the above-described suspension coil spring 10 is explained.

Figure 6:
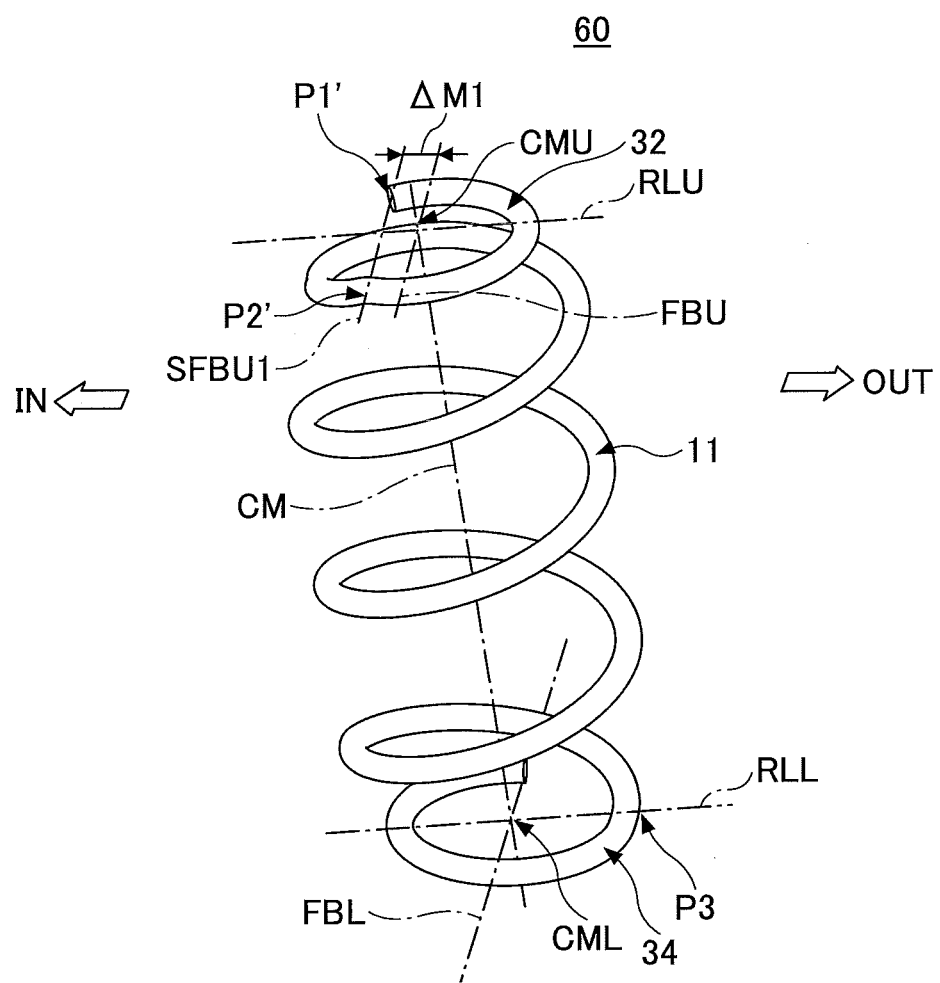
FIG. 6 is a perspective view showing a first modified example of the suspension coil spring according to the embodiment of the present invention.
Figure 7:
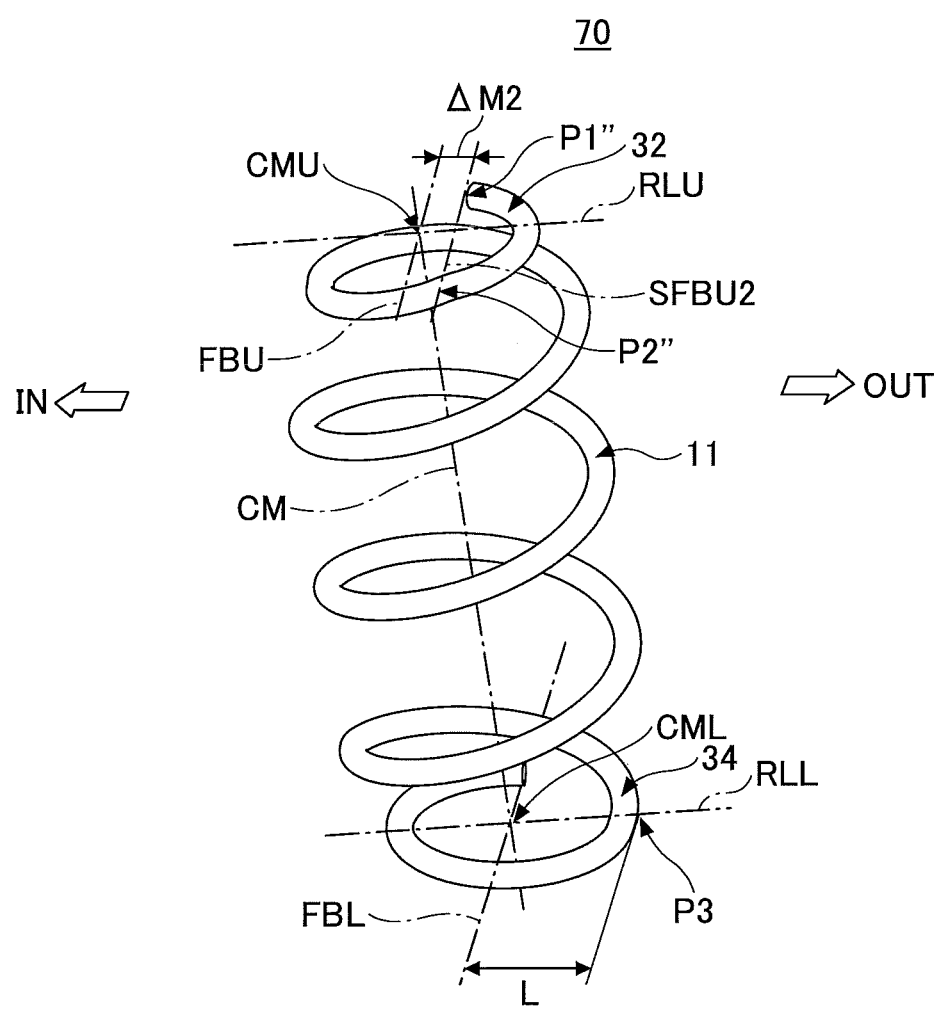
FIG. 7 is a perspective view showing a second modified example of the suspension coil spring according to the embodiment of the present invention.

FIG. 6 shows a suspension coil spring 60 that is a modified example of the suspension coil spring 10. FIG. 7 shows a suspension coil spring 70 that is another modified example of the suspension coil spring 10. Note that, in FIG. 6 and in FIG. 7, the same reference numerals are attached to structures that correspond to the structures of the suspension coil spring 10 that is shown in FIGS. 1 to 5A-5C, and their explanations are omitted.

In the suspension coil spring 60 according to the modified example that is shown in FIG. 6, the upper coil end portion 32 is formed to be approximately 0.6 turns. In this configuration, an upper front-to-rear-direction line SFBU1 that is a line segment that connects the upper contact points P1' and P2' is configured such that it extends in parallel with the upper front-to-rear-direction line FBU. Further, the upper coil end portion 32 that is formed to be the approximately 0.6 turns is configured such that it is substantially symmetrical with respect to the upper left-to-right-direction line RLU.

Furthermore, the upper front-to-rear-direction line SFBU1 does not intersect the upper coil end center point CMU, and the upper front-to-rear-direction line SFBU1 is separated from the upper coil end center point CMU by the distance ΔM1 that is shown in FIG. 6 by the arrows in the direction toward inside the vehicle.

In the suspension coil spring 70 according to the other modified example that is shown in FIG. 7, the upper coil end portion 32 is formed to be approximately 0.4 turns. In this configuration, an upper front-to-rear-direction line SFBU2 that is a line segment that connects the upper contact points P1″ and P2″ is also configured such that it extends in parallel with the upper front-to-rear-direction line FBU. Further, the upper coil end portion 32 that is formed to be the approximately 0.4 turns is configured such that it is substantially symmetrical with respect to the upper left-to-right-direction line RLU. Furthermore, the upper front-to-rear-direction line SFBU2 does not intersect the upper coil end center point CMU, and the upper front-to-rear-direction line SFBU2 is separated from the upper coil end center point CMU by the distance ΔM2 that is shown in FIG. 7 by the arrows in the direction toward outside the vehicle.

The amount of the separation can preferably be set within a range that is greater than or equal to 0.4 turns and less than or equal to 0.6 turns, in terms of the number of turns of the upper coil end portion 32. That is because, when the number of turns of the upper coil end portion 32 is less than 0.4 turns, or when the number of turns of the upper coil end portion 32 is greater than 0.6 turns, the upper contact points P1 and P2 are significantly separated from the upper coil end center point CMU. Thus, it is highly likely that the friction in the sliding portion of the shock absorber 14 is increased, and that a biased load (the spring reaction force) is applied to the bearing 42 of the strut mount 20 and the strut mount 20 is distorted.

In contrast, when the upper coil end portion 32 is greater than or equal to 0.4 turns and less than or equal to 0.6 turns, the friction in the sliding portion of the shock absorber 14 may not be increased, and a biased load (the spring reaction force) may not be applied to the bearing 42 of the strut mount 20 and the strut mount 20 may not be distorted.

The preferred embodiment of the present invention is described in detail above. However, the present invention is not limited to the above-described specific embodiment, and various modifications and alterations may be made within the gist of the present invention that is described in the claims.

For example, in the above-described embodiment, by forming the upper coil end portion 32 to be 0.5 turns, for example, the upper coil end portion 32 and the upper side pedestal 22 can be strongly contacted substantially at two points (the upper contact points P1 and P2). However, protrusions may be formed on the upper coil end portion 32 or the upper side pedestal 22 at the positions that correspond to the upper contact points P1 and P2. With such a configuration, the upper coil end portion 32 and the upper side pedestal 22 can be reliably and strongly contacted at the two points.

Further, in the above-described embodiment, the lower coil end portion 34 is formed to be reverse pitched. In this manner, the lower coil end portion 34 is strongly contacted to the lower side pedestal 24 substantially at the single point, and thereby the spring reaction force axis AR is tilted. However, the lower coil end portion may be formed to be flat, and at the same time, a tilted portion may be formed at the lower side pedestal. In this manner, the spring reaction force axis AR can be tilted.

What is claimed is:

1. A suspension coil spring that is to be installed between an upper side pedestal and a lower side pedestal of a strut type suspension for a vehicle, the suspension coil spring comprising:
   a coil spring main body including multiple coils, the multiple coils including an upper coil end at an upper end of the multiple coils and a lower coil end at a lower end of the multiple coils, wherein, in an installation state of the suspension coil spring, the upper coil end is disposed on the upper side pedestal and the lower coil end is disposed on the lower side pedestal,
   wherein, in a free state in which no load is applied, a coil axis that connects centers of outer diameters of all the multiple coils included in the coil spring main body is a straight line,
   wherein, in the installation state, the upper side pedestal and the upper coil end substantially contact at two upper contact points on the upper coil end,
   wherein, in the installation state, the lower side pedestal and the lower coil end substantially contact at one lower contact point on the lower coil end, and
   wherein the two upper contact points are disposed on the upper coil end so that the two upper contact points are separated in a front-to-rear direction of the vehicle, and the one lower contact point is disposed at a position of the lower side pedestal that is in a direction toward outside the vehicle from a plane that passes through the two upper contact points and that is parallel to a coil central axis.

2. The suspension coil spring according to claim 1, wherein the upper coil end is substantially symmetrical with respect to a line segment that passes through a center point of the upper coil end and that extends in a left-to-right direction of the vehicle.

3. The suspension coil spring according to claim 1, wherein the lower coil end is reverse pitched.

4. The suspension coil spring according to claim 1, wherein a line segment that connects the two points where the upper coil end contacts the upper side pedestal and that extends the front-to-rear direction of the vehicle is positioned within a predetermined range in a left-to-right direction of the vehicle with respect to a center point of the upper coil end.

5. The suspension coil spring according to claim 1,
   wherein a line segment that connects two points where the upper coil end substantially contacts the upper side pedestal and that extends in the front-to-rear direction of the vehicle is on a line segment that passes through a center point of the upper coil end and that extends in the front-to-rear direction of the vehicle or is in parallel with the line segment that extends in the front-to-rear direction of the vehicle.

6. A suspension coil spring that is to be installed between an upper side pedestal and a lower side pedestal of a strut type suspension for a vehicle, the suspension coil spring comprising:
   a coil spring main body such that, in an installation state of the suspension coil spring, an upper coil end is disposed on the upper side pedestal and a lower coil end is disposed on the lower side pedestal,
   wherein, in the installation state, the upper side pedestal and the upper coil end substantially contact at two upper contact points on the upper coil end,
   wherein, in the installation state, the lower side pedestal and the lower coil end substantially contact at one lower contact point on the lower coil end, and wherein the two upper contact points are disposed on the upper coil end so that the two upper contact points are separated in a front-to-rear direction of the vehicle, and the one lower contact point is disposed at a position of the lower side pedestal that is in a direction toward outside the vehicle from a plane that passes through the two upper contact points and that is parallel to a coil central axis, wherein a line segment that connects the two points where the upper coil end contacts the upper side pedestal and that extends the front-to-rear direction of the vehicle is positioned within a predetermined range in a left-to-right direction of the vehicle with respect to a center point of the upper coil end, wherein the predetermined range is a range that is greater than or equal to 0.4 turns and less than or equal to 0.6 turns in terms of a number of turns of the upper coil end, and wherein the upper coil end is substantially symmetrical with respect to the line segment that passes through the center point of the upper coil end and that extends in the left-to-right direction of the vehicle.

7. A strut type suspension comprising:
a suspension coil spring that is to be installed between an upper side pedestal and a lower side pedestal of the strut type suspension for a vehicle, wherein the suspension coil spring includes a coil spring main body including multiple coils, the multiple coils including an upper coil end at an upper end of the multiple coils and a lower coil end at a lower end of the multiple coils, wherein in an installation state of the suspension coil spring, the upper coil end is disposed on the upper side pedestal and the lower coil end is disposed on the lower side pedestal, wherein, in a free state in which no load is applied, a coil axis that connects centers of outer diameters of all the multiple coils included in the coil spring main body is a straight line, wherein, in the installation state, the upper side pedestal and the upper coil end substantially contact at two upper contact points on the upper coil end, wherein, in the installation state, the lower side pedestal and the lower coil end substantially contact at one lower contact point on the lower coil end, and wherein the two upper contact points are disposed on the upper coil end so that the two upper contact points are separated in a front-to-rear direction of the vehicle, and the one lower contact point is disposed at a position of the lower side pedestal that is in a direction toward outside the vehicle from a plane that passes through the two upper contact points and that is parallel to a coil central axis.

* * * * *